US011391513B2

(12) United States Patent
Sabarez et al.

(10) Patent No.: US 11,391,513 B2
(45) Date of Patent: Jul. 19, 2022

(54) DRYING PROCESS AND APPARATUS

(71) Applicant: Commonwealth Scientific and Industrial Research Organisation, Acton (AU)

(72) Inventors: Henry Sabarez, Werribee (AU); Piotr Swiergon, Werribee (AU); Kai Knoerzer, Werribee (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 29 days.

(21) Appl. No.: 16/631,702

(22) PCT Filed: Jul. 19, 2018

(86) PCT No.: PCT/AU2018/050759
§ 371 (c)(1),
(2) Date: Jan. 16, 2020

(87) PCT Pub. No.: WO2019/014722
PCT Pub. Date: Jan. 24, 2019

(65) Prior Publication Data
US 2020/0149813 A1 May 14, 2020

(30) Foreign Application Priority Data
Jul. 20, 2017 (AU) ................................ 2017902844

(51) Int. Cl.
*F26B 19/00* (2006.01)
*F26B 5/02* (2006.01)
(Continued)

(52) U.S. Cl.
CPC ................. *F26B 5/02* (2013.01); *A23L 3/54* (2013.01); *F26B 1/00* (2013.01); *F26B 7/00* (2013.01);
(Continued)

(58) Field of Classification Search
CPC ...... F26B 5/02; F26B 3/36; F26B 1/00; F26B 7/00; F26B 21/06; F26B 2200/02; F26B 2200/06; A23L 3/54
(Continued)

(56) References Cited

U.S. PATENT DOCUMENTS 6,233,844 B1 * 5/2001 Gallego Juarez ......... A23L 3/54 34/164
2002/0040643 A1 * 4/2002 Ware ..................... A23L 3/3418 99/467

(Continued)

FOREIGN PATENT DOCUMENTS

| | | |
|---|---|---|
| CN | 103109919 A | 5/2013 |
| WO | 8912207 | 12/1989 |
| WO | 2004090446 A1 | 10/2004 |

OTHER PUBLICATIONS

International Search Report for International Application No. PCT/AU2018/050759 dated Aug. 22, 2018 (3 pages).

(Continued)

*Primary Examiner* — John P McCormack
(74) *Attorney, Agent, or Firm* — Merchant & Gould P.C.

(57) ABSTRACT

The invention relates to a process and apparatus for ultrasonic assisted drying of materials, in particular, but not exclusively, for the low temperature drying of materials that are heat sensitive. In particular, there is provided an apparatus for dehydration of water containing material comprising: an ultrasound emitter; an ultrasound transmission platform that directly or indirectly supports said material; a fluid retained between said emitter and said platform, through which ultrasound energy is transferred; and a gas stream device that directs drying gas to said material. There is also provided a method of dehydration of water containing material comprising locating the material either directly or indirectly on an ultrasound transmission platform of a dehy-
(Continued)

(a)

(b)

dration apparatus that comprises: an ultrasound emitter; a fluid retained between said emitter and said platform, through which ultrasound energy is transferred; and a gas stream device that directs drying gas to said material; and exposing said material to ultrasound energy and drying gas flow for a time and under conditions suitable to achieve desired extent of dehydration of said material. In another aspect there is provided a material that has been dehydrated using the method or apparatus described above.

20 Claims, 6 Drawing Sheets

(51) Int. Cl.
*A23L 3/54* (2006.01)
*F26B 1/00* (2006.01)
*F26B 7/00* (2006.01)
*F26B 21/06* (2006.01)

(52) U.S. Cl.
CPC .......... *F26B 21/06* (2013.01); *F26B 2200/02* (2013.01); *F26B 2200/06* (2013.01)

(58) Field of Classification Search
USPC .... 34/69, 246, 250, 252, 255, 259, 262, 401
See application file for complete search history.

(56) References Cited

U.S. PATENT DOCUMENTS

2010/0199510 A1* 8/2010 Plavnik ............... B41F 23/0466 34/60
2011/0271548 A1* 11/2011 Park .......................... F24F 3/14 34/475
2016/0025411 A1* 1/2016 Plavnik ................. F26B 13/001 34/279

OTHER PUBLICATIONS

International Preliminary Report on Patentability for PCT/AU2018/050759 dated Jan. 21, 2020 (5 pages).
European Search Report for EP Application No. 18835253.8 dated Oct. 20, 2020 (12 pages).

* cited by examiner (a)

(b)

(a)

(b)

(a)

(b)

(a)

(b)

DRYING PROCESS AND APPARATUS

This application is a National Stage Application of PCT/AU2018/050759, filed 19 Jul. 2018, which claims benefit of Serial No. 2017902844, filed 20 Jul. 2017 in Australia and which applications are incorporated herein by reference. To the extent appropriate, a claim of priority is made to each of the above disclosed applications.

FIELD OF THE INVENTION

The present invention relates to a process and apparatus for ultrasonic assisted drying of materials, in particular, but not exclusively, for the low temperature drying of materials that are heat sensitive.

BACKGROUND OF THE INVENTION

The traditional process of drying food materials is (in most cases) an energy-intensive operation that often imparts significant alterations in the nutritional and functional attributes of the product, primarily due to the exposure of food materials to high temperatures or long drying times. Similar considerations apply to other heat sensitive solid materials that require dehydration, such as fine chemicals, pharmaceuticals and other biologically active agents (e.g. proteins, carbohydrates, peptides, nucleic acids, antibodies, enzymes, plasmids), microorganisms, bacterial cultures, agricultural products, plant and animal derived materials, and the like.

Many drying techniques evolved due to the need to produce high quality dried products that are highly heat-sensitive. Such drying systems include the utilisation of temperatures below freezing and vacuum operating pressure (e.g., freeze drying). Freeze drying (also known as lyophilisation) is a drying process in which a material to be dried is first frozen and then dried by direct sublimation (i.e., by undergoing phase change directly from solid to vapour) of the ice under reduced pressure. From a quality point of view, freeze drying is considered to be one of the best drying methods for the drying of heat sensitive materials. However, freeze drying is expensive in comparison to other drying techniques as the required equipment involves high capital costs and operational costs are also high due to high energy consumption. Further, the throughput of freeze drying is relatively low compared to other drying techniques due to the need to operate in a batch-wise process (Sabarez, 2014; Ratti, 2001).

Drying below freezing point can also be performed at atmospheric pressure, known as atmospheric freeze drying (AFD) (Claussen et al, 2007; Meryman, 1959). This drying technique consists of blowing low temperature and low water vapour pressure air (as drying medium) through the product to cause direct moisture sublimation from frozen material, at atmospheric pressure. AFD combines the advantages of both freeze drying (high product quality) and convective drying (low cost and continuous process) and AFD has the advantage of low energy consumption because there is no need for a vacuum. The equipment is therefore much simpler and less capital intensive than that required for freeze drying and continuous operation is possible due to operation at atmospheric pressure. However, working at atmospheric pressure and low temperatures leads to very low drying rates (i.e., longer drying times) than vacuum freeze drying. These limitations can be overcome by the combined application of ultrasound (US) to intensify the low temperature drying process of materials at atmospheric pressure.

For many years it has been known that energy generated by sound pressure waves can enhance a wide range of processes due to a series of mechanisms activated by the ultrasonic energy, such as heat, diffusion, mechanical rupture, and chemical effects (Gallego-Juarez et al., 2007). Several studies have shown the application of ultrasound to be highly effective in intensifying the convective drying process of food materials. However, the magnitude in which ultrasound enhances the drying process greatly varies depending upon the efficiency of propagation and transmission of ultrasonic energy into the material to be dried. It is also necessary to ensure adaptability of ultrasound assisted drying to industrial scale drying operations.

U.S. Pat. No. 6,233,844 discloses an ultrasound assisted drying device that requires direct coupling of the material to be dried with the ultrasound emitter. For example, the ultrasound emitter plates are lowered from a trolley system to be in direct contact with the material to be dried. The drawback of this approach is that direct contact of the ultrasound emitter plates with the material to be dried minimises the surface area of the material available to interact with a drying gas, with the result that this technique is not amenable to adoption in conjunction with traditional air flow drying processes.

International Patent Publication No. WO 2013/041750 also discloses an ultrasound assisted drying device and process, which in this case involves an ultrasound radiator that is either in direct contact with the material to be dried or transmits the ultrasound energy through the air to the material to be dried. In the case of air transmission of ultrasound, the energy transfer to the material to be dried is inefficient. In the case of direct contact between the ultrasound radiator and the material to be dried there are difficulties in adoption in conduction with traditional air flow drying processes and in operation in other than a batch-wise process.

The present invention relates to an improved approach for the application of ultrasound to intensify low temperature drying of materials, either under atmospheric conditions or as a means of improving the efficiency of the drying of materials under vacuum. In this invention the ultrasonic energy is transmitted indirectly from the US emitter through a retained fluid (which can be liquid or gas or a combination of both) to an US transmission platform and on to the material to be dried. In preferred aspects the present invention allows for efficient ultrasound transmission to the material to be dried, as the mismatch of acoustic impedances is minimised, and it allows for operation in conjunction with traditional air drying and/or freeze drying processes, along with easy adoption in continuous processing. The present invention can therefore give rise to significant energy savings, increased production throughput (as the drying process can be carried out continuously) as well as reduction in drying times at low drying temperatures, which may in turn contribute to improved product quality through the avoidance or minimisation of thermal degradation.

SUMMARY OF THE INVENTION

According to one embodiment of the present invention there is provided an apparatus for dehydration of water containing material comprising:

- an ultrasound emitter;
- an ultrasound transmission platform that directly or indirectly supports said material;
- a fluid retained between said emitter and said platform, through which ultrasound energy is transferred;

a gas stream device that directs drying gas to said material.

In another aspect of the invention there is provided method of dehydration of water containing material comprising locating the material either directly or indirectly on an ultrasound transmission platform of a dehydration apparatus that comprises:

an ultrasound emitter;

a fluid retained between said emitter and said platform, through which ultrasound energy is transferred;

a gas stream device that directs drying gas to said material;

and exposing said material to ultrasound energy and drying gas flow for a time and under conditions suitable to achieve desired extent of dehydration of said material.

In another aspect of the invention there is provided a material that has been dehydrated using the method or apparatus defined above.

BRIEF DESCRIPTION OF THE FIGURES

The present invention will be described by way of example with reference to the figures, as follows.

DETAILED DESCRIPTION OF THE INVENTION

Figure 1:
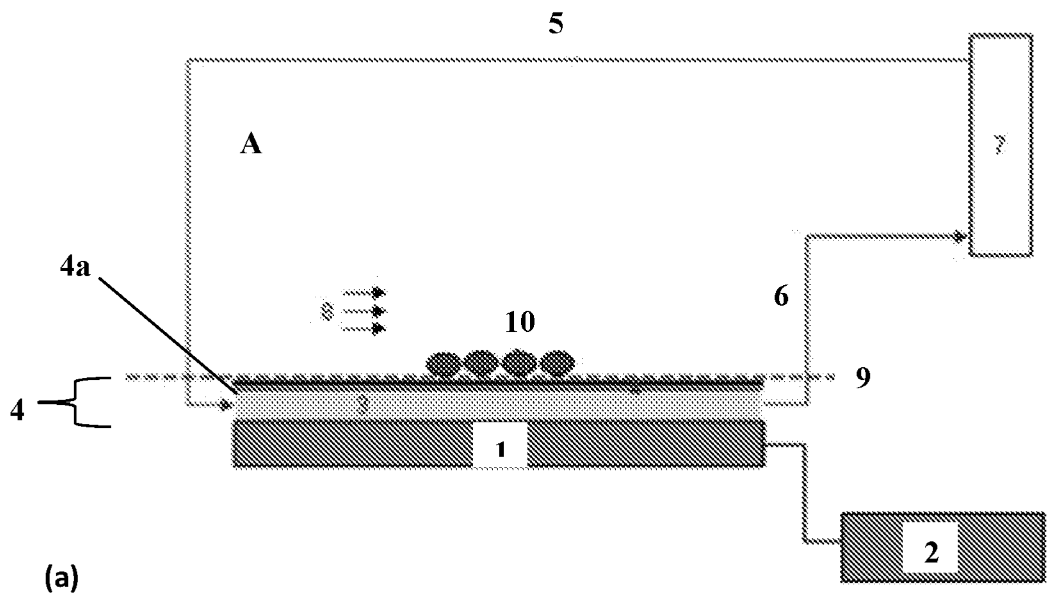
FIG. 1 shows a schematic diagram of the ultrasound-assisted drying unit/system according to the invention, wherein the unit/system shown in (a) is an open unit and that shown in (b) includes a housing.
Figure 1:
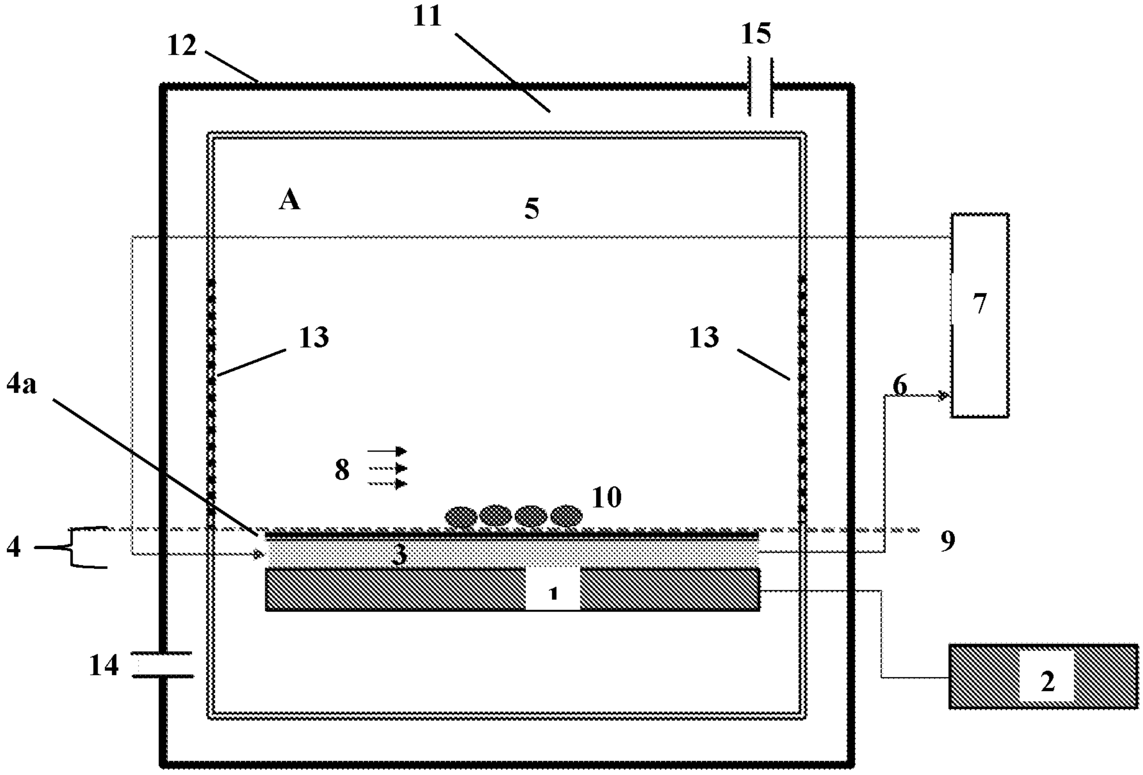

Throughout this specification and the claims that follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Documents referred to within this specification are included herein in their entirety by way of reference.

The reference to any prior art in this specification is not, and should not be taken as, an acknowledgment or any form of suggestion that that prior art forms part of the common general knowledge in Australia.

In a broad aspect, the present invention provides an efficient apparatus and method that is amenable for continuous processing for dehydration of water containing materials, preferably solid materials, and particularly materials that are subject to degradation associated with thermal drying processes. The present inventors have demonstrated that improved drying efficiency may be achieved by adoption of air drying in conjunction with application of ultrasound (US) energy, where the US is applied to the material to be dehydrated through a fluid (a liquid, gas or combination thereof) that is retained between an emitter of US energy and an ultrasound transmission platform upon which the material to be dried is either directly or indirectly supported.

The terms "dehydration" and "drying" are used interchangeable throughout this specification as denoting removal of water from a water containing material. For example, materials that may contain water and that can be dried or dehydrated according to the present invention include food materials such as fruit, vegetables, meat, milk and dairy products, nuts, seeds, grains, pulses, leaves, roots, eggs and components or processed foods derived therefrom such as flour, bread, pastry or pasta doughs, custards, preserves, sweets, sauces and syrups. In particular, materials that can be dried according to the invention include fruits such as apple, pear, peach, apricot, plum, mango, tomato, pineapple, kiwi fruit, pawpaw, papaya, berries, fig and the like. Coffee beans, tea leaves and herbs and spices are also materials that can be dried according to the invention. Fine chemicals such as pigment, dye, polymer and chemical feedstock, pharmaceutical, other biologically active agent, protein, carbohydrate, amino acid, peptide, nucleic acid, antibody, enzyme, plasmid, microorganism, bacterial culture, agricultural product or plant or animal derived products, animal feed, vitamin, nutritional supplement, fertiliser, mineral and the like may also be dehydrated according to the invention. Components or products derived from any of the materials listed can also be dried according to the invention.

Although it is preferred that the materials to be dried are in a solid form it is also possible to dehydrate liquid or gel materials. For example, highly viscous liquids, gels or doughs may be supported during dehydration directly on the US transmission platform of the drying apparatus, whereas less viscous liquids can be retained in an open vessel and are thus indirectly supported during drying on the US transmission platform.

A key aspect of the present invention is that the US energy utilized to assist drying of the material to be dried is transmitted from a US emitter through a retained fluid to a US transmission platform that either directly or indirectly supports the material to be dried. The fluid (liquid, gas or combination thereof) through which the US energy is transmitted can conveniently also serve the purpose of a coolant through the adoption of a fluid that has a low freezing point such as from about −1° C. to about −30° C., −2° C. to about −20° C. or about −4° C. to about −10° C. Examples of fluids that can be used include water, preferably saline water or water with added sugar, ethylene glycol or propylene glycol to reduce the freezing temperature, or hydrocarbon or hydrofluorocarbon refrigerant gas.

In one aspect of the invention a heat exchanger is included in the recycling flow path of the fluid through which the US energy is transmitted so that temperature of the fluid can be controlled and excess heat can be captured and reused, for example in heating of the drying gas. Preferably the fluid heat exchanger is under automated control so that a set point or temperature range (at the point where the fluid comes into contact with the US transmission plate) can be maintained which can be modified depending upon the nature of the material being dried and the desired rate and extent of drying. For example, fluid temperatures in the range of from about −30° C. to about 10° C., such as from about −25° C. to about 5° C., about −20° C. to about 0° C., −15° C. to about −5° C. or about −12° C., about −10° C., about −8° C. or about −6° C. are contemplated.

By reference to the material to be dehydrated being directly supported on the US transmission platform it is intended to convey that the material is placed directly upon the platform. This is in contrast to the material being indirectly supported on the US transmission platform, which is intended to convey that another agent is placed between the material and the platform, such as a vessel to retain the material, particularly in the case where the material is in the form of a liquid, gel, powder, small grains or crystals that is/are not amenable to being placed directly on the platform. An agent located between the platform and the material to be dried can also take the form of a conveyor belt, mesh or web that can optionally be adopted to make the drying process of the invention a continuous process rather than a batch process.

By way of example only, the US emitter adopted in the present invention may operate at a frequency of from about 15 kHz to about 10 MHz, such as from about 100 kHz to about 5 MHz, from about 200 kHz to about 2 MHz or about 500 kHz to about 1500 kHz, 800 kHz to about 1200 kHz or about 900, 950, 1000, 1050, 1100 or 1150 kHz. The US emitter may operate at a power output of from about 100 W to about 1000 W, such as from about 200 W to about 800 W, such as from about 250 W to about 750 W, about 300 W to about 550 W or about 325 W, 335 W, 350 W, 355 W, 360 W, 380 W, 400 W, 450 W or 500 W.

The dryer apparatus and method of the invention requires a gas stream device that generates and directs a drying gas to the material to be dried. In preferred embodiments the drying gas is air that is directed over the material to be dried using a fan forced air flow system, optionally directed through one or more vents or ducts. Alternatively the gas stream device can involve pressurized gas flow through a nozzle or series of nozzles that direct the gas to the location of the material to be dried. In closed operating system embodiments of the invention alternative drying gasses such as nitrogen or argon can be used, particularly in the case where the material to be dried is reactive or liable to degradation in an oxygen containing atmosphere.

In one aspect of the invention the gas stream device is in fluid communication with perforations in the surface of the US transmission platform such that the material to be dried is exposed to drying gas that emanates from the surface of the US transmission platform. This may be either instead of, or in addition to, drying gas directed over the material to be dried from a fan, vent, duct, nozzle or the like that is located towards the side or above the material.

By way of example, the drying gas may be directed at or over the material to be dried at a flow rate of from about 0.2 m/s to about 5 m/s, such as from about 0.5 m/s to about 3.0 m/s, about 0.7 m/s to about 2.0 m/s, about 0.8 m/s to about 1.5 m/s or about 0.9 m/s, about 1.0 m/s, about 1.1 m/s, about 1.2 m/s, about 1.3 m/s or about 1.4 m/s. The drying gas velocity, temperature and relative humidity can be varied according to the nature of the material being dried and the desired rate and extent of drying. For example, drying gas temperatures between about 0° C. and about 80° C. are contemplated, such as from about 5° C. to about 70° C., about 10° C. to about 60° C., about 15° C. to about 55° C., about 20° C. to about 50° C., about 25° C. to about 45° C. or about 30° C., about 35° C. or about 40° C.

Preferably the drying gas will be relatively dry at the point where it first comes into contact with the material to be dried and may, for example, have a relative humidity of from about 5% to about 35%, such as form about 10% to about 30%, about 12% to about 25%, about 14% to about 20% or about 15%, about 16%, about 17%, about 18% or about 19%.

The gas stream device will preferably include drying gas recycling means and the US transmission platform upon which the material to be dried is supported with preferably located within a housing to prevent or at least minimize escape of the drying gas. The temperature and relative humidity of the drying gas can readily be controlled by the inclusion in the gas stream device of temperature control and dehumidifier elements. In preferred aspects the control of these elements is automated such that the drying gas temperature, velocity and humidity can be maintained at a desired set point at least before it is exposed to the material to be dried on each circulation.

It is also possible, again depending upon the nature of the material to be dried and the desired rate and extent of drying to conduct the drying process under partial vacuum, in which case the housing encompassing the US transmission platform will be substantially sealed and reinforced to withstand vacuum conditions and a vacuum pump will be incorporated within the apparatus, which is also preferably under automated control to enable maintenance of vacuum conditions at a set point. For example a partial vacuum pressure of from about 0.3 Atm. to less than 1 Atm. is suitable, such as from about 0.4 Atm. to about 0.95 Atm., about 0.5 Atm. to about 0.9 Atm., about 0.6 Atm. to about 0.8 Atm. or about 0.65 Atm., about 0.7 Atm. or about 0.75 Atm.

The US transmission platform is preferably formed from a rigid, durable, non-corrosive and heat conductive substance such as a suitable ceramic or polymer or more likely a non-corrosive metal such as aluminium, stainless steel or titanium. In most cases stainless steel will offer appropriate characteristics and is also a cost effective material that will withstand repeated cleaning and sterilization cycles.

In one aspect the US transmission platform comprises a plate which is optionally perforated that is removably fixable to a lower housing that incorporates fluid retention means and may, in the case of a perforated US transmission platform, include drying air flow channels in communication with the perforations in the plate. In another embodiment the upper plate of the US transmission platform includes grooves, channels or indentations, which may form a network, within which the perforations are located. By having the drying gas emanate from the platform through grooves, channels or indentations the surface area of the material that comes into contact with the drying gas can be maximized. The grooves, channels or indentations will need to be configured in such as manner that they can readily be cleaned and sterilized.

As outlined by Michaud, et al (2015), when a sound wave encounters a solid surface such as the wall of a reactor, a part of the wave energy is reflected, while a part penetrates through the solid material. Once the sound wave penetrates to the other side of the solid, a portion of the sound wave will again be reflected, and a part will be transmitted into the medium on the other side of the solid material. The extent of transmission and reflection is dependent on the properties of the materials on both sides of the boundary, i.e., liquid/solid and solid/liquid or solid/gas boundaries, with more reflection occurring at increasing density differences between the two materials.

In the ultrasonic frequency range of 64-359 kHz Boyle et al. (1929 and 1930) examined the transmission through steel plates where water was the liquid on both sides of the plates and showed that transmission reaches a maximum and impedance approaches zero, when the thickness of the plate is a multiple of half the wavelength of the sound wave. Therefore, a thickness ratio $d/\lambda$ can be devised, where d is the plate thickness and lambda ($\lambda$) is the wavelength of the sound wave. The transmission reaches a maximum every time the thickness ratio is reaching a multiple of 0.5. With this in mind, in order to maximize efficiency of US transmission to the material to be dried it is desirable to tune the wavelength of the US energy applied such that the distance between the US emitter and the material supported on the US transmission platform is or approaches a multiple of half the wavelength of the US wave.

In another aspect of the present invention, efficiency of the drying process can be improved by pre-treating the material to be dried before subjecting the material to the dehydration treatment of the invention. In one aspect this involves immersing the material in an oil-in-water emulsion (for example, suitable oil-in-water emulsions comprise from about 0.1% to 2.5% of vegetable-based oil (e.g., canola oil, olive oil, coconut oil) or food grade ethyl oleate in water, at pre-treatment temperatures from about 20° C. to 60° C. A vessel containing the emulsion and the material can then be located directly or indirectly on the ultrasound transmission platform and the emulsion and the material can then be exposed to ultrasonic energy for a time and under suitable conditions to achieve a level of disruption to surface structure of said material to thereby enhance moisture transfer during subsequent dehydration. The material can then removed from the emulsion and surface liquid can be removed before the material is subjected to normal dehydration treatment according to the invention.

In a further aspect of the invention the material to be dried is immersed in osmotic solution to aid dehydration, comprising locating a vessel comprising the osmotic solution and the material directly or indirectly on said ultrasound transmission platform and exposing the osmotic solution and the said material to ultrasonic energy according to the process of the invention. The osmotic solution that may be used includes a sugar solution (e.g., fruit juice concentrates, sucrose) with concentrations from about 40% to 70% Brix and exposing the osmotic solution and the material to the ultrasonic energy for a suitable treatment time, temperature of the osmotic solution and mass ratio of the material to osmotic solution to achieve a level of structural disruption of the material to thereby enhance the moisture transfer during osmotic dehydration process or during subsequent normal air drying process. The osmotic solution treatment is intended either as a pre-treatment step to enhance the subsequent normal drying process or as an alternative drying process to reduce the moisture content of the material.

Specific embodiments of the invention will now be described in detail with reference to the drawings, wherein the US assisted drying unit/system (A) is shown in FIG. 1. The unit/system (A) comprises a US emitter 1 powered by a US power supply 2, which are in electrical communication. Located above the US emitter is a US transmission platform 4 which comprises an upper plate 4*a* and a fluid system 3, wherein the fluid system 3 is a closed system that allows for recirculation of fluid retained therein via a fluid inflow 5, and fluid outflow 6. In preferred embodiments of the invention the fluid outflow 6 is directed to a heat exchanger and pump (herein depicted together) 7, through which the temperature of the fluid can be controlled. The fluid system 3 is necessarily located between the US emitter 1 and the upper plate 4*a* in order that US energy emanating from the US emitter 1 passes through the fluid system 3 before reaching the upper plate 4*a* part of the US transmission platform 4, upon which the material 10 to be dried is either directly or indirectly located.

In embodiments of the invention that enable the drying process to be conducted continuously a conveyor 9 comprising a mesh or web, that is permeable to drying air emanating from perforations 16 in the upper plate 4*a* below, is located above the upper plate 4*a* in order that the material 10 can be progressed along the upper plate 4*a* at a controlled rate.

FIG. 1(*a*) depicts a US assisted drying unit/system (A) that is an open system, wherein the drying gas 8 that is directed from a gas stream device (not shown) across the material 10 to assist drying is not able to be recaptured and parameters of the atmosphere to which the material 10 is exposed such as temperature, pressure and relative humidity are not controlled.

In the embodiment of the invention depicted in FIG. 1(*b*) a housing 11 is provided around the US transmission platform 4 in order that escape of drying gas can be prevented or at least reduced. In this embodiment of the invention the housing 11 comprises an outer wall 12 and a gas permeable inner wall 13. The drying gas 8 emanating from the gas stream device (not shown) enters the housing 11 through drying gas inlet 14, penetrates gas permeable parts of the gas permeable inner wall 13 and is directed across the material 10 to exert its drying action. Drying gas 8 will then exit the housing through permeable parts of the gas permeable inner wall 13 and the drying gas outlet 15, whereupon the spent drying gas 8 can be recycled, by being directed through a dehumidifying/condensing device and/or a heat exchanger in order that the relative humidity and/or temperature of the drying gas 8 can be controlled. The drying gas 8 can be propelled through this recycling loop via the application of positive or negative pressure. In some embodiments of the invention it will be desirable to assist the dehydration process by simultaneously applying a vacuum to the drying environment and in such cases the housing 11 and drying gas recycling loop will necessarily be substantially airtight and reinforced to withstand the vacuum pressure applied to the drying environment.

Figure 2:
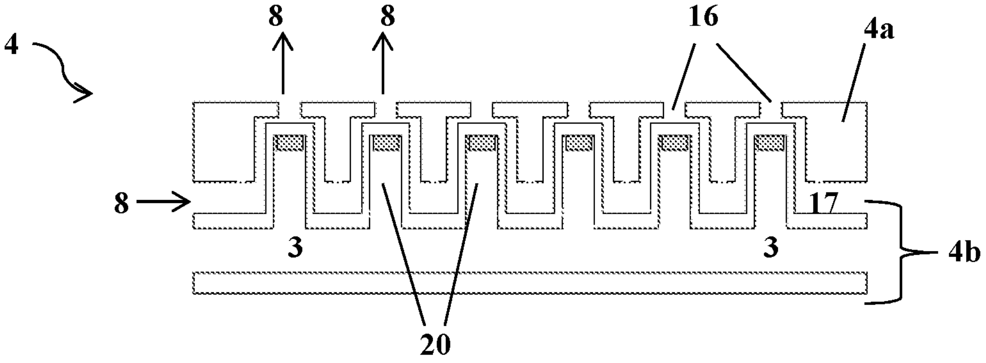
FIG. 2 shows a cut away side view of a perforated ultrasound transmission platform of the ultrasound-assisted drying system.
Figure 3:
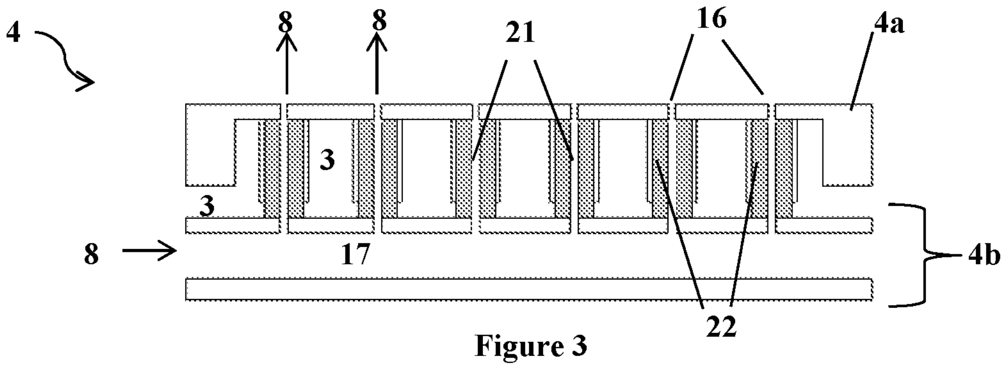
FIG. 3 shows a cut away side view of an alternative arrangement of the perforated ultrasound transmission platform of the ultrasound-assisted drying system.

In FIGS. 2 and 3 two alternative forms of the US transmission platform 4 are depicted. FIG. 2 shows a form of the US transmission platform 4 comprising an upper plate 4*a* that includes a plurality of perforations 16 there through and a lower housing 4*b* that defines the fluid system 3. The lower housing 4*b* includes a plurality of projections 20, such that when the upper plate 4*a* is fastened to the lower housing 4*b* the space there between defines a drying gas void 17 configured in such a way that drying gas 8 passes through the drying gas void 17 and penetrates the upper plate 4*a* through the perforations 16.

Figure 7:
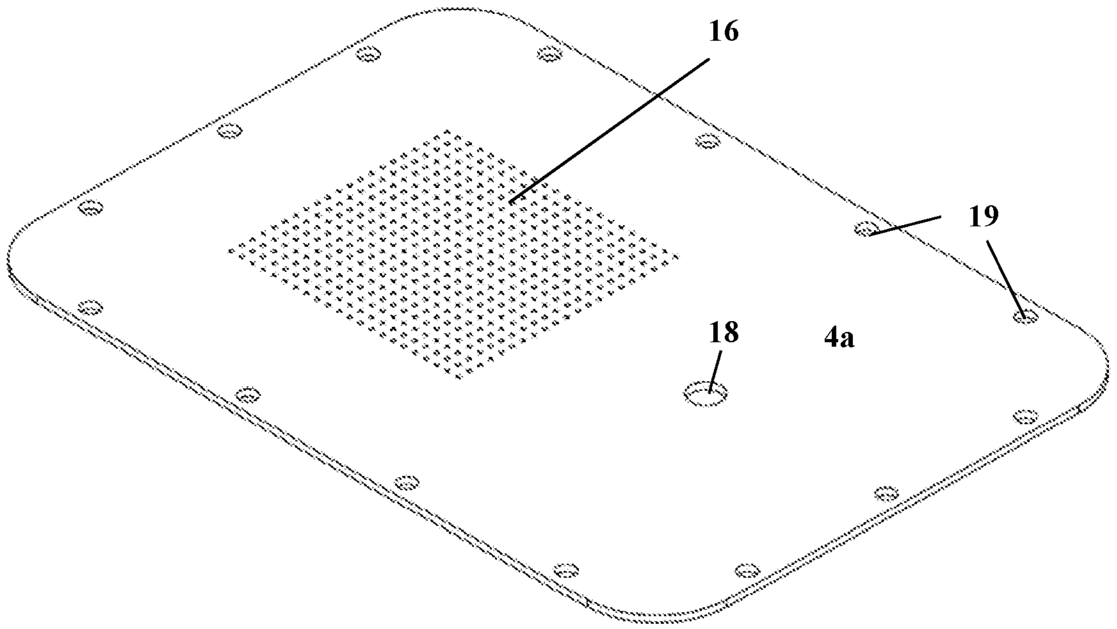
FIG. 7 shows an exploded perspective view from above of a perforated US transmission platform that comprises an upper perforated plate (a) and a lower housing (b) with integrated channels for drying gas flow.
Figure 7:
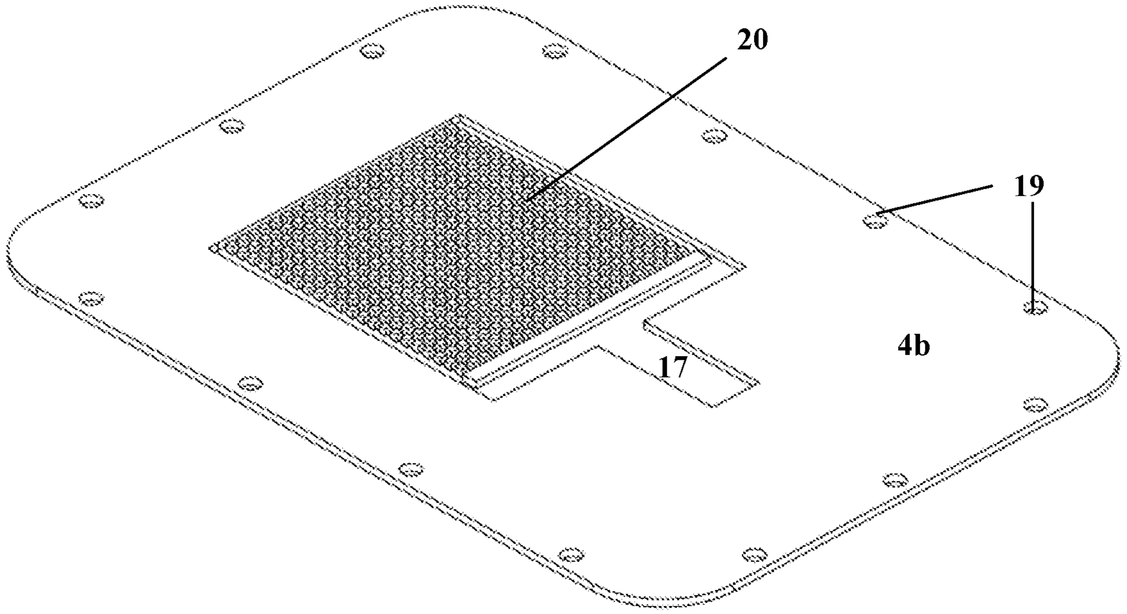

A perspective view from above of the same arrangement shown in FIG. 2 is depicted in FIG. 7 wherein in FIG. 7(*a*) the upper plate 4*a* is shown including a plurality of perforations 16 and wherein in FIG. 7(*b*) the lower housing 4*b* is shown, depicting the projections 20, wherein when the upper plate 4*a* is fastened to the lower housing 4*b* channels between the projections 20 and additional space through a cutout recess in the lower housing 4*b* define the drying gas void 17. A drying gas circuit attachment point 18 is provided in the upper plate 4*a* to enable attachment to the drying gas recirculation circuit that derives from the gas stream device. Fastening points 19 are provided about the periphery of both upper plate 4*a* and lower housing 4*b* to enable fastening of these integers together and connection beneath the lower housing 4*b* to the US emitter 1. The fluid system 3 is located beneath lower housing 4*b* (but not shown) and will be adjacent to the US emitter when the components of the drying unit/system (A) are assembled for use.

In an alternative embodiment of the invention depicted in FIG. 3 the lower housing 4*b* includes a drying gas void in a lower region in communication with a plurality of drying gas channels 21 that extend upwardly through a plurality of elongated sections 22. The upper plate 4*a* includes a plurality of perforations 16 that are configured to enable the flow of drying gas 8 through the drying gas channels 21 and to penetrate through the perforations 16 of the upper plate 4*a* when the upper plate 4*a* is fastened above the lower housing 4*b*. Also when the upper plate 4*a* is fastened against the lower housing 4*b* the space between these two components defines the fluid system 3, through which cooling fluid can circulate.

Figure 4:
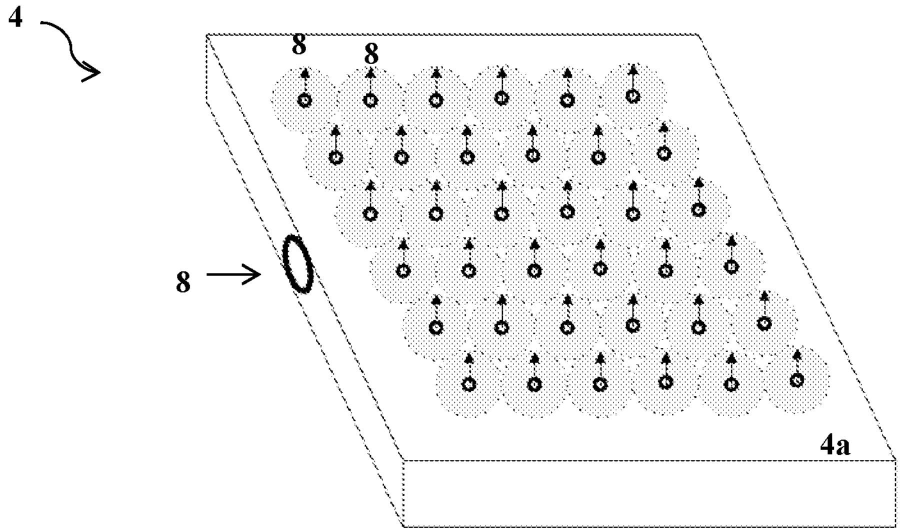
FIG. 4 shows a perspective view from above of a perforated ultrasound transmission platform of the ultrasound-assisted drying system

A schematic representation from above showing the flow path of drying gas 8 through the US transmission platform 4 and penetrating upwardly from perforation 16 in the upper plate 4*a* is provided in FIG. 4.

Figure 5:
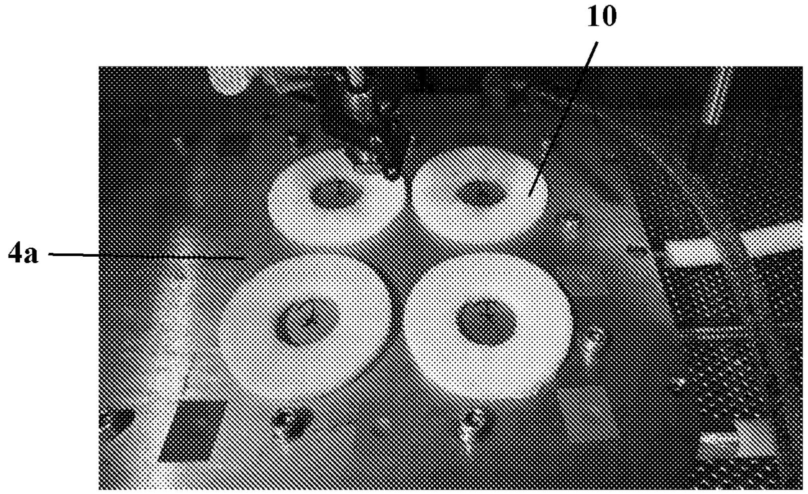
FIG. 5 shows a perspective photograph from above of an ultrasound transmission platform (non-perforated) of the ultrasound-assisted drying system, showing fresh apple ring samples in place on the platform for drying.
Figure 6:
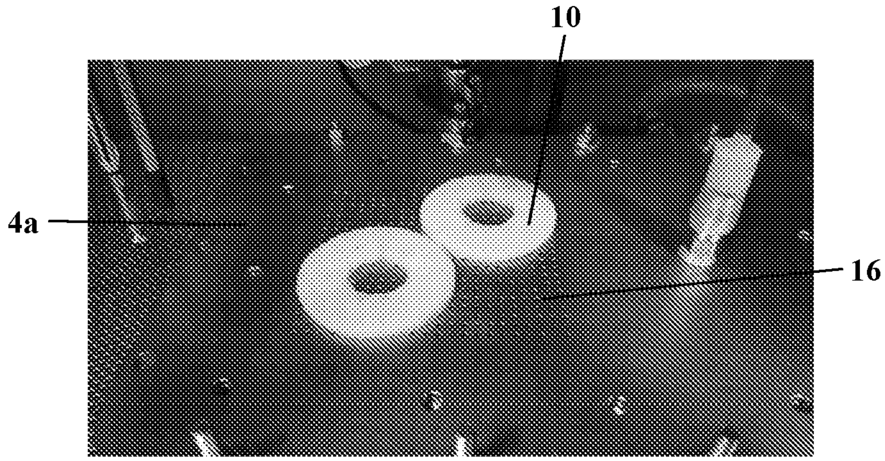
FIG. 6 shows a perspective photograph from above of a perforated ultrasound transmission platform of the ultrasound-assisted system, showing fresh apple ring samples in place on the platform for drying.

In FIGS. 5 and 6 material 10 (in this case annular rings of apple cut to 5 mm thickness) is shown in position for dehydration on the upper plate 4*a* of the US transmission platform 4. The US assisted drying unit/system (A) shown in FIG. 5 does not include perforations through the upper plate 4*a*, and in this case the flow of drying gas 8 is solely across the material 10 to be dried. In contrast, the unit/system (A) shown in FIG. 6 includes perforations 16 to enable the upward flow there through of drying gas 8. In this embodiment drying gas can also be directed across the top of the upper plate 4*a* upon which the material 10 is supported during drying.

The invention will now be further described with reference to the following non-limiting examples.

EXAMPLES

Materials & Methods

Sample Preparation

Fresh apples (cv. Granny Smith) obtained from a local market (Werribee, Victoria, Australia) were used as the model test material and were stored at 4° C. until further use. Prior to the experiments, the apple samples were removed from the cool room and equilibrated to ambient room temperature. The apples were cut horizontal to their axes into slices of 5 mm thickness using an electric slicer and then into cylinders using a stainless steel tubular cork borer of 60 mm diameter with a sharp edge. The cores were then removed using a similar cork borer of 20 mm diameter to form annular rings. Only the middle four or five annular rings per apple were used in the experiments. The apple rings were soaked in 20° C. tap water immediately after cutting to prevent browning and then blotted with paper towels to remove the adhering surface water.

Drying Experiment

Drying experiments were carried out in a computerised ultrasound-assisted convective drying setup as described elsewhere (Sabarez et al, 2012). The purpose-built test drying facility incorporated a number of special features including a fully programmable cyclic control of process conditions (i.e., temperature, humidity, and air flow), an ultrasonic unit, and a dedicated weighing system. A schematic diagram of the ultrasonic assisted drying unit (the present invention) retrofitted in the test drying facility is shown in FIG. 1. In this unit the ultrasonic energy is transmitted indirectly (from the ultrasound emitter through the fluid (the liquid or gas or combination or both) to the transmission platform and into the material to be dried). This indirect transmission of ultrasound energy allows for efficient ultrasound transmission as the mismatch of acoustic impedances of these materials (steel, liquid & food) is minimised. To control the temperature of the ultrasonic transmission platform, a refrigerated water bath (Model BL-130, Thermoline) was used to continuously recirculate temperature-controlled water into the ultrasound assisted drying unit.

Two sets of drying experiments were initially carried out using a plane, unperforated ultrasound transmission platform (Example 1). Further experiments were conducted at different treatment conditions using a perforated ultrasound transmission platform (both with and without air supply through the perforations) (Example 2). These drying experiments were undertaken both with and without ultrasound at 1000 kHz and at power of 355 W. All the drying experiments were carried at drying air temperature of 40° C., relative humidity of 15% and drying air velocity of 1.2 m/s. In these experiments, the apple ring samples were directly placed on the transmission platform. Four annular apple rings prepared as outlined above were used for each drying experiment. All drying experiments were replicated at least twice.

Rehydration Study

Rehydratability is one of the most important functional attributes of dried products (particularly dried foods), the objective of which is restoration to the greatest extent possible of the original properties of the raw (or fresh) materials before drying took place (e.g., solids and moisture content). Rehydratability is considered a measure of the injury to the material caused by the drying process, which may induce significant changes in material structure and composition, especially in plant derived materials.

Samples of apple rings earlier dried either with or without ultrasound were taken for the rehydration study. The rehydration experiments were carried out in separate 250 mL Erlenmeyer flasks dipped in a temperature-controlled water bath filled with water maintained at 20° C. At least two apple ring samples immersed in water (i.e., 1:50 w/w solids to liquid ratio) were used for each treatment. The changes in weight of the samples were measured at pre-determined time intervals by quickly removing the samples from the water bath and wiping with absorbent paper to remove moisture adhering to the fruit surface. The samples were then weighed in an electronic balance and returned to the water bath to continue the rehydration process.

Results

Figure 8:
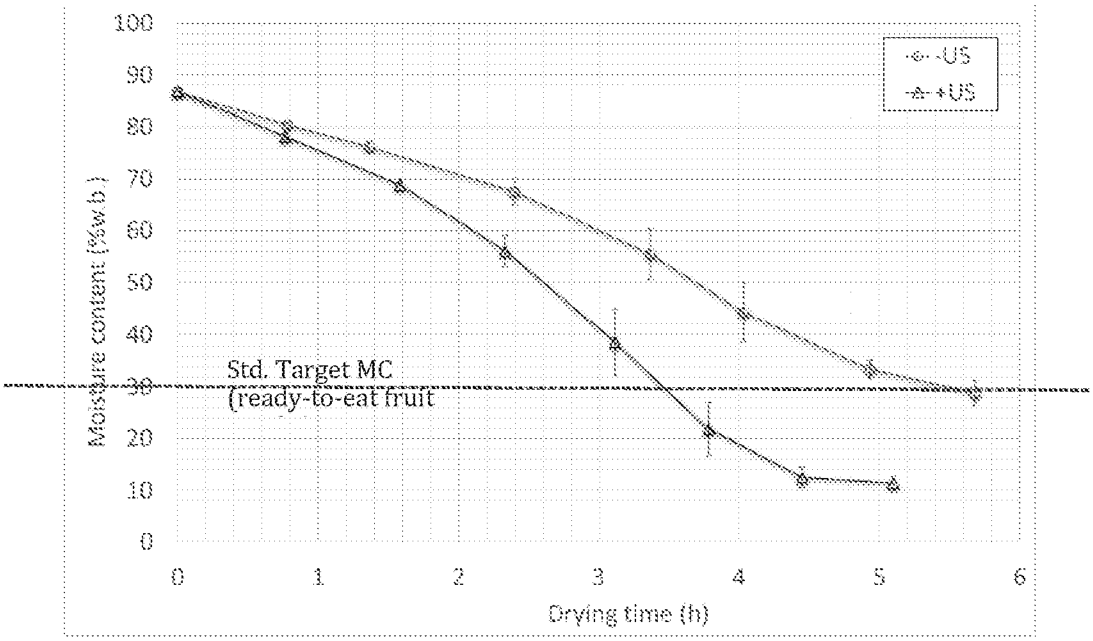
FIG. 8 shows (a) a graph of moisture content (percent water by weight of sample) against drying time (hours) for samples subjected to drying both with (triangles) and without (circles) the use of ultrasound; and (b) a graph of percentage weight gain against rehydration time (hours) for the rehydration of samples that were earlier dried both with and without the use of ultrasound. This figure demonstrates the effect of ultrasound on (a) drying kinetics profile and (b) rehydration profile of apple slices (5 mm thickness) during low temperature air drying (temperature (T)=40° C.; Relative Humidity (RH)=15%; Drying air velocity (V)=1.2 m/s). (Ultrasound (US) conditions: US plane transmission plate; Power=355 W; Frequency=1000 kHz; continuous application; water bath temp=40° C.); (Rehydration conditions: T=20° C. in water).
Figure 8:
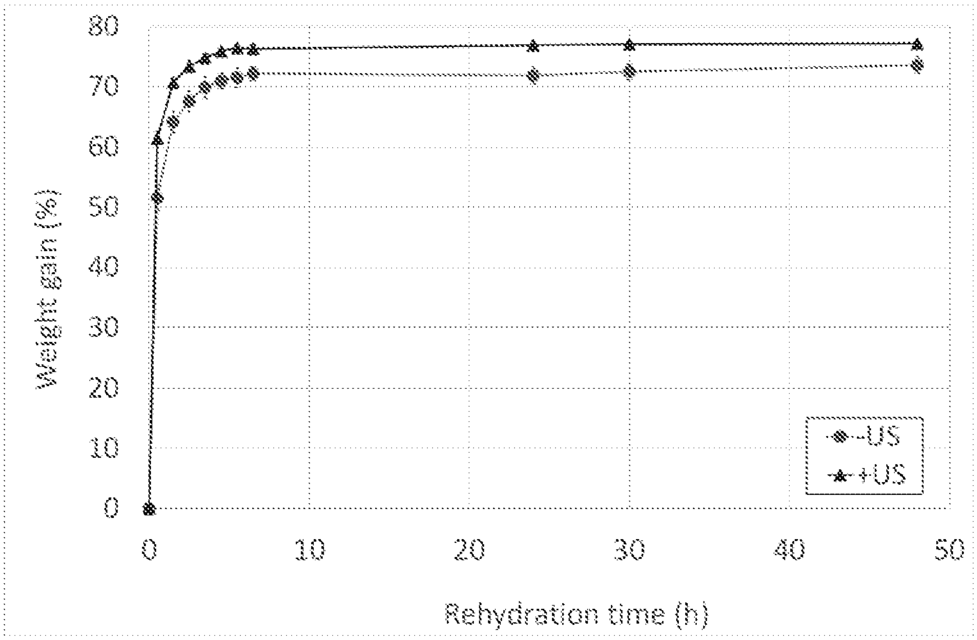

FIG. 8(*a*) shows the results of the drying experiments conducted to remove water from fresh apple ring samples (5 mm thickness) using the ultrasound assisted drying unit of the invention with a plane (unperforated) transmission plate (as shown in FIG. 5). FIG. 8(*a*) illustrates the changes in moisture content (y-axis) with time (x-axis) of the samples during drying. Under these drying conditions, it can be seen that the application of ultrasound significantly reduced the drying time compared to the experiments that were carried out without the application of ultrasound. To achieve the target final moisture content of 30%, drying time was reduced from 5.7 hours to 3.5 hours by the application of ultrasound. This represents a decrease in drying time of about 39% with the application of ultrasound.

FIG. 8(*b*) shows the rehydration kinetics of the corresponding apple samples dried both with and without ultrasound. The figure illustrates the changes in weight gain (y-axis) with rehydration time (x-axis) during rehydration. As can be seen in this figure, the samples dried with ultrasound showed a much faster rehydration rate (or rate of weight gain) and a higher maximum amount of water it absorbed upon immersion until equilibration compared to the samples dried without ultrasound. This is indicative of reduced drying initiated damage to the material compared to the material not dried with the assistance of ultrasound energy.

Figure 9:
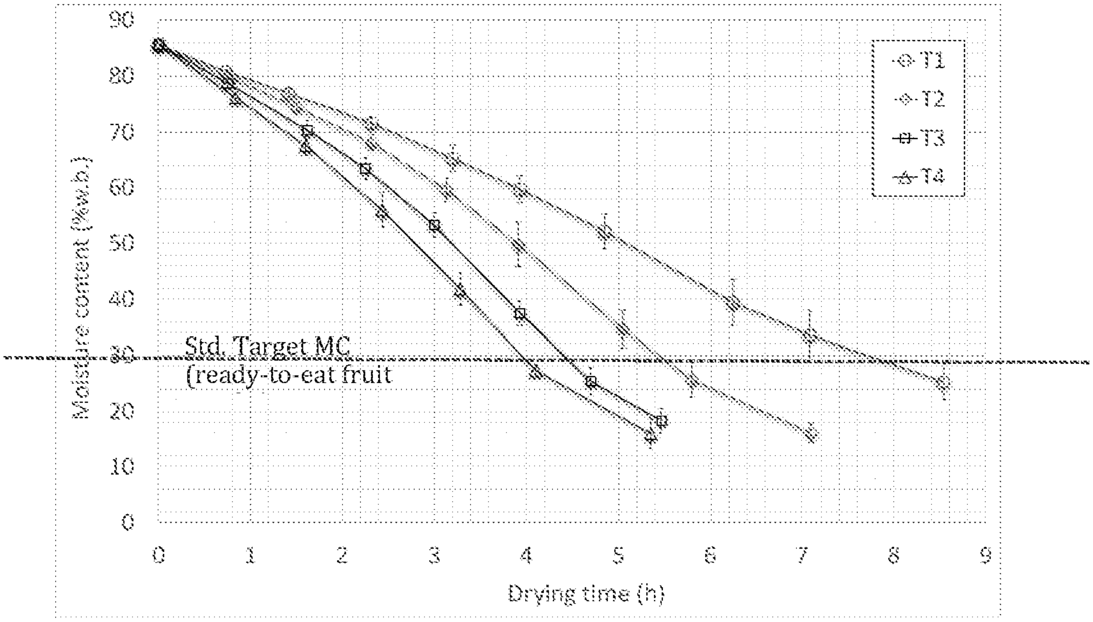
FIG. 9 shows (a) a graph of moisture content (percent water by weight of sample) against drying time (hours) for samples subjected to drying under conditions T1 to T4; and (b) a graph of percentage weight gain against rehydration time (hours) for the rehydration of samples that were earlier dried under conditions T1 to T4. This figure demonstrates the effect of ultrasound on (a) drying kinetics profile and (b) rehydration profile of apple slices (5 mm thickness) during low temperature air drying (T=40° C.; RH=15%; V=1.2 m/s) at different treatment conditions. (US conditions: US perforated transmission plate; Power=355 W; Frequency=1000 kHz; continuous application; water bath temp=40° C.); (Rehydration conditions: T=20° C. in water). (Treatment conditions: T1: US Off and Air Off (control); T2: US On and Air Off; T3: US Off and Air On; T4: US On and Air On).
Figure 9:
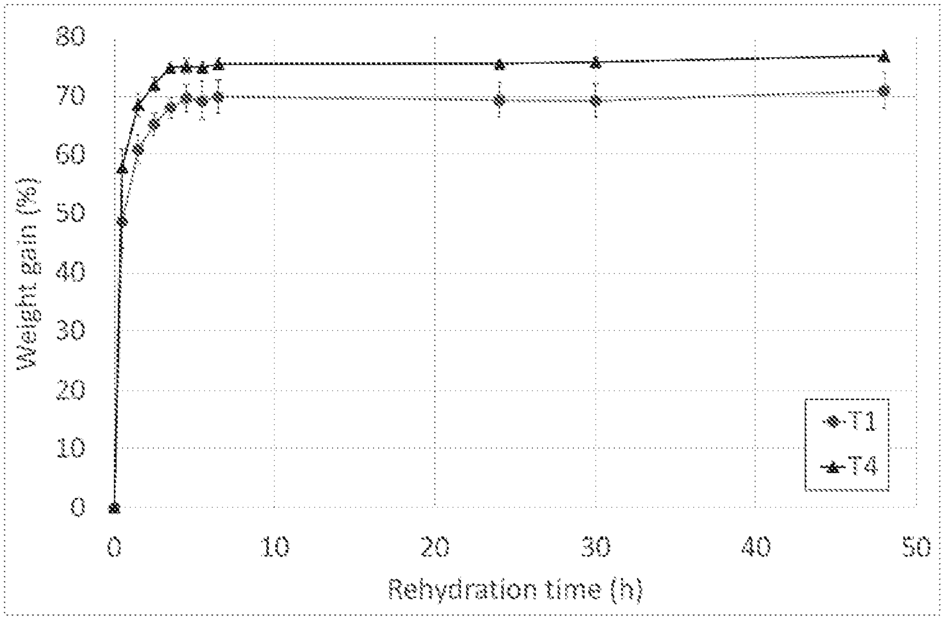

FIG. 9(*a*) shows the results of the experiments conducted to investigate the effect of different treatment conditions (with and without air flow through perforations of the ultrasound transmission platform) on the drying kinetics of fresh apple samples (5 mm thickness) using the ultrasound assisted drying unit with perforated transmission platform (as shown in FIG. 6). Similarly, FIG. 9(*a*) illustrates the changes in moisture content (y-axis) with time (x-axis) of the samples during drying. It is clear from FIG. 9(*a*) that the application of ultrasound combined with air flow through the perforated transmission platform enhanced the drying process. To achieve the target moisture content of 30%, analysis of the drying curves revealed that it took about 7.8 hours to dry the apple samples without ultrasound (T1), 5.5 hours with ultrasound and without air flowing through the perforated transmission platform (T2), and just 4.0 hours with ultrasound in combination with air flow through the perforated transmission platform (T4). The results indicate a reduction in drying time of about 49% with the application of ultrasound in combination with air flow through the perforated transmission platform compared with the control (T1). Similarly, the application of ultrasound in combination with air flow through the perforated transmission platform (T4) resulted in significantly improved rehydratability (in terms of faster rehydration and higher maximum amount of water absorbed upon immersion until equilibration) as compared with the control (T1), which is indicative of reduced damage to the material initiated through the drying process.

REFERENCES

R. W. Boyle & D. K. Froman, Reflection of sound energy and thickness of plate reflector—ultrasonic method, *Can. J. Res.* 1 (5) (1929) 405-425.

R. Boyle & D. Sproule, Transmission of sound energy and thickness of plate transmitter at normal incidence—ultrasonic method, *Can. J. Res.* 2 (1) (1930) 3-12.

I. C. Claussen et al., Atmospheric freeze drying—A review, *Drying Technology,* 25 (2007), 957-967.

J. A. Gallego-Juarez et al., Application of high-power ultrasound for dehydration of vegetables: Processes and devices, *Drying Technology,* 25 (11) (2007) 1893-1901.

H. T. Meryman, Sublimation. Freeze-drying without vacuum, *Science,* 130 (1959) 628-629.

M. Michaud et al., Design parameters of stainless steel plates for maximizing high frequency ultrasound wave transmission, *Ultrasonics Sonochemistry,* 26 (2015) 56-63

C. Ratti, Hot air and freeze-drying of high-value foods: a review. *Journal of Food Engineering,* 49 (2001) 311-319.

H. T. Sabarez et al., Ultrasonic-assisted convective drying of apple slices, *Drying Technology,* 30 (9) (2007) 989-997.

H. T. Sabarez, Modelling of drying processes for food materials. In '*Modelling food processing operations.*' Bakalis S, Knoerzer K, Fryer P (eds.). Woodhead Publishing, An Imprint of Elsevier, Elsevier B. V., Chapter 4, 95-123, (2014).

The claims defining the invention are as follows:

1. An apparatus for dehydration of water containing material comprising:

an ultrasound emitter;

an ultrasound transmission platform that directly or indirectly supports said material;

a fluid retained between said emitter and said platform, through which ultrasound energy is transferred;

a gas stream device that directs drying gas to said material.

2. The apparatus according to claim 1 comprising a housing to prevent or reduce escape of drying gas.

3. The apparatus according to claim 2 further comprising a vacuum pump for exposing said material to a partial vacuum.

4. The apparatus according to claim 1 further comprising a heat exchanger for cooling of said fluid.

5. The apparatus according to claim 4 wherein said heat exchanger enables said fluid to be cooled to a temperature below freezing temperature of water at pressure to which said material is exposed.

6. The apparatus according to claim 2 further comprising a de-humidifier for extracting water from drying gas after exposure to said material.

7. The apparatus according to claim 1 wherein said platform comprises perforations in fluid communication with said gas stream device to enable drying gas to be directed to said material through said platform.

8. The apparatus according to claim 7 wherein said perforations are located within grooves, channels or indentations within said platform that serve to increase surface area of said material to which drying gas is exposed.

9. A method of dehydration of water containing material comprising locating the material either directly or indirectly on an ultrasound transmission platform of a dehydration apparatus that comprises:

an ultrasound emitter;

a fluid retained between said emitter and said platform, through which ultrasound energy is transferred;

a gas stream device that directs drying gas to said material; and exposing said material to ultrasound energy and drying gas flow for a time and under conditions suitable to achieve desired extent of dehydration of said material.

10. The method according to claim 9 wherein said apparatus comprises a housing that prevents or reduces escape of drying gas.

11. The method according to claim 10 wherein said apparatus further comprises a vacuum pump that generates a partial vacuum to which said material is exposed.

12. The method according to claim 9 wherein said apparatus further comprises a heat exchanger that cools said fluid.

13. The method according to claim 12 wherein said heat exchanger cools said fluid to a temperature below freezing temperature of water at pressure to which said material is exposed.

14. The method according to claim 9 wherein the apparatus further comprises a de-humidifier that extracts water from said drying gas after its exposure to said material.

15. The method according to claim 9 wherein said apparatus comprises a platform comprising perforations in fluid communication with said gas stream device that direct said drying gas to said material through said platform.

16. The method according to claim 15 wherein said perforations are located within grooves or indentations within said platform that serve to increase surface area of said material to which drying gas is exposed.

17. The method according to claim 9 wherein said material is a food material, fine chemical, pharmaceutical, biologically active agent, protein, carbohydrate, peptide, nucleic acid, antibody, enzyme, plasmid, microorganism, bacterial culture, agricultural product or plant or animal derived product.

18. The method according to claim 9 wherein said material is pre-treated by immersion before dehydration in an oil-in-water emulsion by locating a vessel containing said emulsion and said material directly or indirectly on said ultrasound transmission platform and exposing the emulsion and said material to ultrasonic energy for a time and under suitable conditions to achieve a level of disruption to surface structure of said material to thereby enhance moisture transfer during subsequent dehydration.

19. The method according to claim 9 wherein said material is immersed in osmotic solution to aid dehydration, comprising locating a vessel comprising said osmotic solution and said material directly or indirectly on said ultrasound transmission platform and exposing said osmotic solution and the said material to ultrasonic energy.

20. A dehydrated material that has been dehydrated using an apparatus for dehydration of water containing material comprising:

an ultrasound emitter;

an ultrasound transmission platform that directly or indirectly supports said material;

a fluid retained between said emitter and said platform, through which ultrasound energy is transferred;

a gas stream device that directs drying gas to said material or the method according to claim 9.

* * * * *